May 19, 1970 — J. F. O'REGAN ET AL — 3,512,761
HIGH EXPANSION FOAM GENERATOR
Original Filed Nov. 25, 1966 — 2 Sheets-Sheet 1

INVENTORS.
JAMES F. O'REGAN,
BERTIL A. LUNDBERG &
WALTER J. MUSSONI
BY Tilbury & Body
ATTORNEYS May 19, 1970  J. F. O'REGAN ET AL  3,512,761
HIGH EXPANSION FOAM GENERATOR
Original Filed Nov. 25, 1966  2 Sheets-Sheet 2
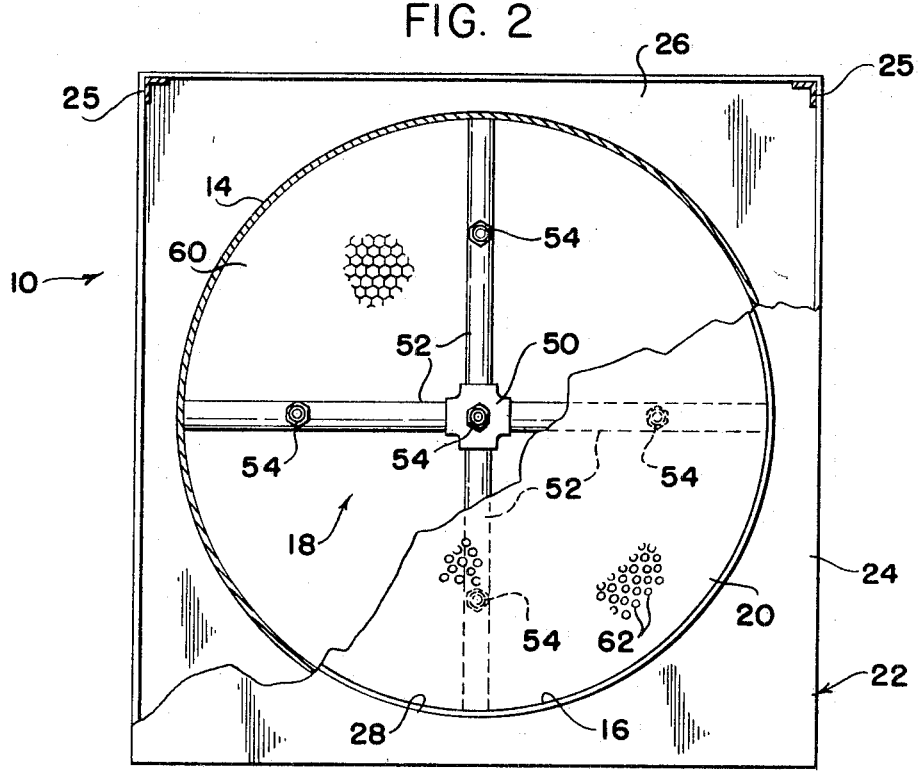
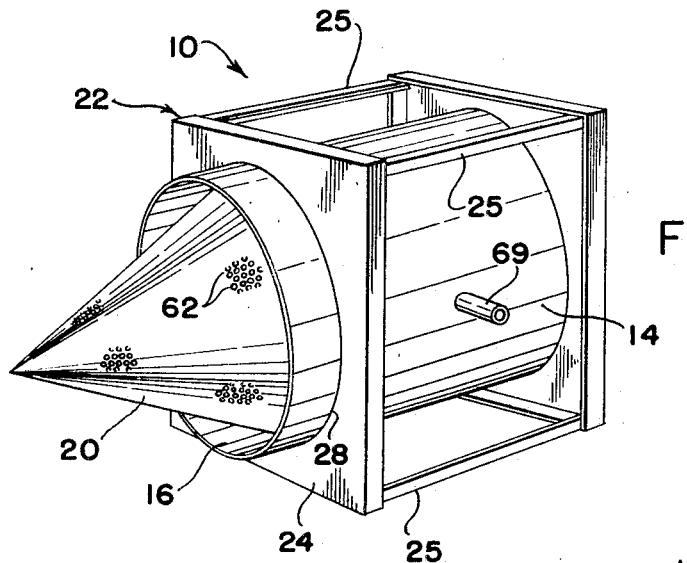
INVENTORS.
JAMES F. O'REGAN,
BERTIL A. LUNDBERG &
WALTER J. MUSSONI
BY Tillbury & Body
ATTORNEYS United States Patent Office 3,512,761
Patented May 19, 1970

3,512,761
HIGH EXPANSION FOAM GENERATOR
James F. O'Regan, Bertil A. Lundberg, and Walter J. Mussoni, Worcester, Mass., assignors to E. W. Bliss Company, Canton, Ohio, a corporation of Delaware
Continuation of application Ser. No. 597,170, Nov. 25, 1966. This application Apr. 10, 1968, Ser. No. 720,412
Int. Cl. B01d 47/00; F02m 37/00, 69/02
U.S. Cl. 261—25                          3 Claims

ABSTRACT OF THE DISCLOSURE

Apparatus for generating high expansion foam of the type formed by blowing air through a sieve or mesh the openings of which have been filmed over with a liquid foam solution deposited thereon by an airstream. The apparatus includes a tubular housing having an axial flow fan mounted at one end and the mesh or sieve mounted at the other. The fan is rotated by an hydraulic motor adapted to be connected to a fluid pressure source. Jet spray means are connected to the fluid pressure source to introduce a spray of liquid foaming agent downstream of the fan. The spray is blown along by the airstream and deposited against the mesh or sieve.

---

This application is a continuation of application Ser. No. 597,170, filed Nov. 25, 1966, now abandoned, which was a continuation of application Ser. No. 362,596, filed Apr. 27, 1964, and now abandoned.

This invention relates to foam production apparatus and more particularly deals with fire protection equipment capable of making ultra-high expansion foam characterized by having a high gas to liquid content.

Most present day high expansion foam generators induct large volumes of air into an air tunnel or the like by means of electrically powered blowers which then force the air into foam production by blowing or beating it into a liquid foam solution. The employment of such equipment at a fire site is conditioned upon its ability to be moved to the most effective vantage point and upon the availability of an electrical outlet. Also, equipment of this type is not always safe or operable in wet places, a common occurrence around a fire where standing water may be present. Obviously, an electrically powered blower type generator inherently creates a hazard for personnel and equipment in having to be operated in an environment where the combined use of electricity and water is required.

To overcome these and other disadvantages, it is a purpose of this invention to provide an hydraulically powered blower for a foam generator which operates solely by means of fluid pressure such as water pressure. This source of power is usually available at a fire site in the form of pumping equipment on motorized fire fighting units, hence the need for an additional energy source for the foam generator is eliminated.

In accordance with the invention, a foam generator is provided having an air tunnel which houses a blower; spray jets which introduce a foam and water spray solution into the air tunnel downstream of the blower; and a foam generating perforated member or sieve which covers the free-passage-area of the tunnel downstream of the spray jets. In particular, an hydraulic motor means is provided for driving the blower and is operable from the same fluid pressure source used for supplying the liquid water and foam solution to the spray jets.

It is also a purpose of the invention to provide a foam generator which may be used strictly as a smoke or fume evacuator. As often occurs at a fire site, a room or building may be filled with dense smoke creating a peril to the lives of fire fighting personnel and the occupants. Evacuating the smoke presents a problem with electrically powered blowers. Obviously, electrical energy may not be available under such conditions.

Accordingly, to overcome this problem, the present invention utilizes a recirculating fluid system for operating the blower motor independently of the spray jets.

Therefore, a general object of the invention is to provide an ultra-high expansion foam generator primarily for the purpose of extinguishing fires which can be employed at a first site where only fluid pressure is available as a power source.

A more specific object is to provide a fire protection unit of this type where large volumes of air are forced into foam generation by means of a blower having an hydraulic motor means operable from the same fluid pressure source required to supply water and foam solution to the unit.

Another specific object is to provide fire protection equipment of this general class in which the water and foam solution is introduced downstream of the blower.

Another object of the invention is to provide a pipe network which will accommodate both the requirements of a fluid operated motor means for the blower and the spray jets.

A further object is to utilize sieve placed across the air tunnel in the path of the air-borne spray as a mechanism for producing foam.

An additional object is to provide a foam generator which also may be operated as a smoke or fume evacuator.

These and other objects will become clear when reference is made to the following description and drawings wherein;

FIG. 2 is an end view of the generator shown in FIG. 1 with the net and end wall partially broken away; and FIG. 3 is a perspective view of the foam generator shown in FIG. 1.

Figure 1:
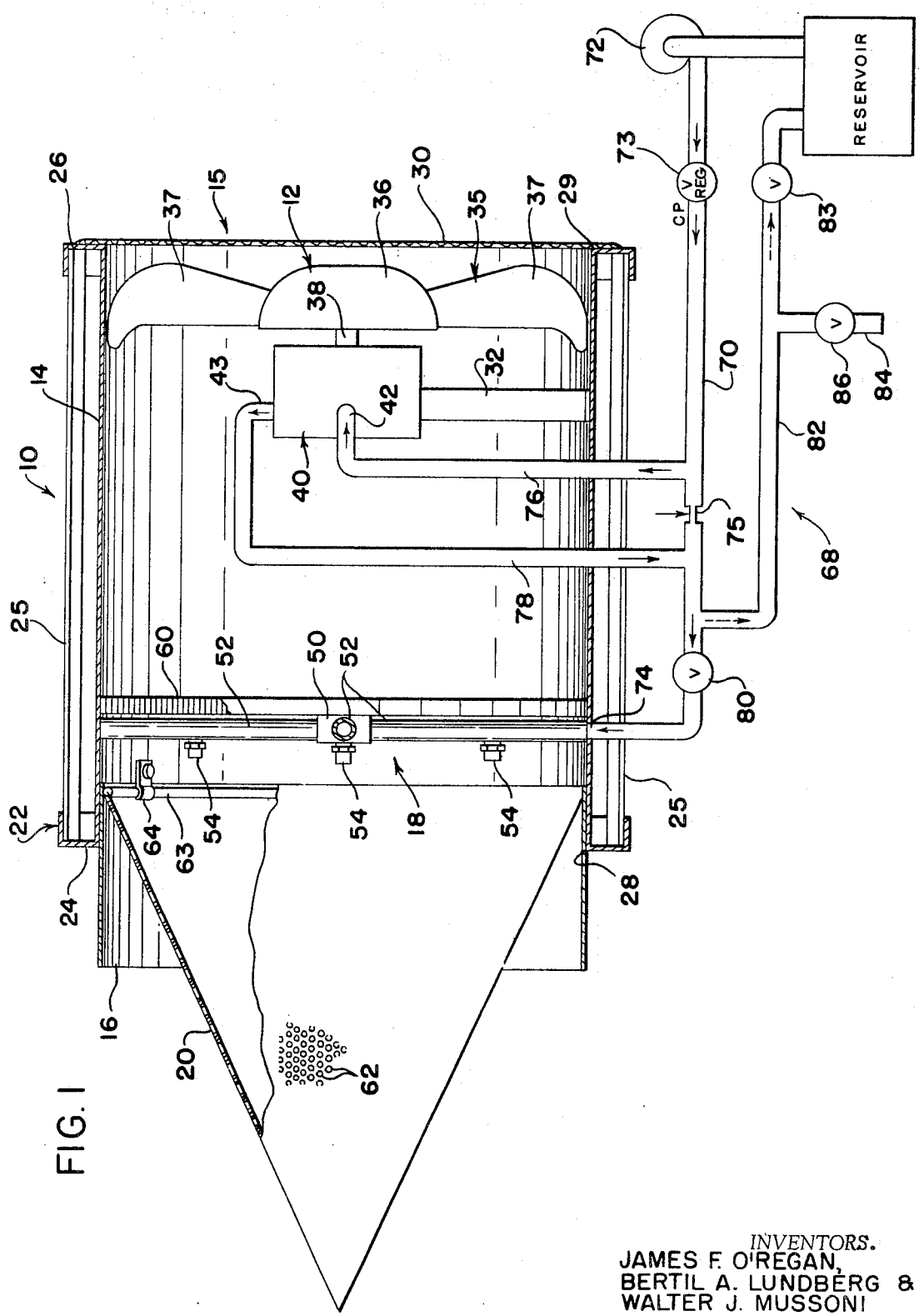
FIG. 1 is a side sectional view showing a foam generator incorporating the invention.

While the invention is illustrated and described with respect to a foam generator adapted for extinguishing fires, it is to be understood that other uses may be visualized without departing from the principles thereof. The foam generator may be permanently installed at a given location or hand-carried into position at a fire site. Conventional fire fighting equipment at the site such as pumps and water hoses may be used in conjunction with the invention without the need for auxiliary equipment.

Referring now to the FIGS. 1 to 3 in general terms, a foam generator 10 is shown which includes a motor powered blower unit 12 mounted within an air tunnel or tube 14 having an inlet 15 and outlet 16. A spray jet battery 18 located downstream of the blower unit 12 introduces a spray of foam and water solution into the air tunnel 14. A sieve or foam generating perforated member 20 covers the free-passage-area of the air tunnel downstream of the nozzle battery 18 and is wet by the airborne spray carried along in the air stream generated by the blower.

In more detail, the generator 10 includes a box frame 22 having end walls 24 and 26 which are spaced by struts 25 at each corner providing a rigid support structure. The end walls 24 and 26 have circular openings 28 and 29 through which the ends of the tube 14 open forming an air tunnel or passage having aligned inlet and outlet openings.

The blower unit 12 is mounted on a pillar 32 near the inlet end of the air tunnel and is protected by a safety screen 30 covering the inlet. Blower unit 12 includes a fan member 35 having a hub 36 from which extend a plurality of radially extending fan blades 37. The hub 36 may be splined to a shaft 38 of a fluid operated motor, indicated generally by the numeral 40, having pressurized fluid inlet and outlet openings 42 and 43 respectively.

Downstream of the blower unit 12 is the spray nozzle battery 18 which includes a cross fitting 50 having 90 degree space outlets for delivering pressurized fluid to the blind conduits 52. Five nozzles 54, four opening from the conduits 52 and one from the cross fitting, act to atomize the foam and water solution. While five nozzles are shown it is understood that any number consistent with efficient operation of the generator may be used. Immediately upstream of the spray battery 18 is a grill 60 having a honeycombed structure serving as an air diffuser.

The sieve 20 downstream of the nozzle battery 18 has a plurality of discrete openings 62. While a perforated sieve structure is shown in generally conical form, this is not to be regarded as a limitation of the invention, but is merely a convenient structure presenting a large surface area through which the air must pass. The openings 62, while relatively small, may range in size between a maximum and minimum consistent with efficient foam production. Openings ranging between 30 and 50 per square inch have been found to work well. While a semi-rigid material may be used to make the net structure, a fabric mesh is preferred which may be folded out of the way when the unit is not in use. A bead 63 about the periphery of the net is secured within the air tunnel by clip fasteners 64 to hold it in place.

To get a general idea of the actual size of the unit shown, the overall longitudinal dimensions, disregarding the sieve 20, may be in the order of 24 inches and the inner diameter of the air tunnel may be around 16 inches. These dimensions are illustrative only and are not intended as limitations of the invention but are provided merely to give an indication of the relative size.

A pipe system generally indicated by the numeral 68, while shown schematically for easier understanding, would actually be housed within the unit and would have an inlet opening through the wall of tube 14 as indicated at 69 in FIG. 3. The pipe system includes a main supply line 70 which is connected at one end to a source of fluid pressure here shown as a centrifugal pump and reservoir unit generally indicated by the numeral 72. This equipment would normally be found at the fire site, for example pumping units are standard on most fire trucks therefore they represent a readily available source of fluid pressure. A pressure regulator 73 insures an even delivery pressure. The foam and water solution in the reservoir is delivered to the pump and from there under pressure to the spray battery 18 at a connection 74 provided on one end of a conduit 52. A valve 80 within the main supply line may be operated to shut off the spray battery. A restriction 75 in the main supply line 70 provides a pressure drop therein which is utilized to operate the blower unit 12. Of course, a direct connection from the pumping unit to the blower motor 40 may be made providing sufficient motor outlet pressure is available and regulated to operate the nozzles 54.

As seen by inspection, in the preferred arrangement a first conduit or branch 76 connects with the main supply line 70 at one end upstream of the restriction 75 and at the other end to the inlet 42 of the fluid motor 40. A second conduit or branch 78 connects at one end to the main supply line 70 downstream of the restriction 75 and at the other end to the outlet 43 of the fluid motor 40. The fluid motor 40, while not shown in detail, is understood to be of a conventional construction and forms no part of the present invention. Generally, such a unit may be regarded as an hydraulic pump operating in reverse where the fluid pressure acts within an expanding chamber to rotate a driven member, such as a gear. The shaft 38 is connected to such a driven member and rotates the fan 35.

The pipe system 68 includes a return line 82 connected at one end to the main supply line between the connection for branch 78 and the spray battery 18 and at the other end to the reservoir inlet of the pumping unit 72 so as to provide a recirculating path for unused foam and water solution. Valve 83 within the return line may be operated to divert returning fluid away from the pumping unit 72 and instead direct it into a drain 84 regulated by valve 86.

Blower operated foam generators of the class described commonly employ electrically powered fans or the like to provide the volume and velocity of air required to produce ultra-high expansion foam. As mentioned before, these devices have shortcomings which limit their employment. Naturally, fire fighting units must be placed at the most effective vantage point which may not be exactly where the electrical outlets are. Of course these units nearly always require a fluid pressure source for creating a foam and water solution spray.

In accordance with this invention therefore, a fluid source is used to operate both the blower and the spray nozzles thus greatly enlarging the areas of application where foam generators may be used. The invention is accomplished by the use of a pipe network designed with reference to the novel fire protection equipment so as to accommodate the requirements of both a fluid operated motor means to power the blower and at the same time supply pressurized foam and water solution to the spray jets or nozzles.

In operation, the pumping unit 72 would be mounted on a truck or the like with appropriate hose lines leading to the generator. A plurality of generators may be hooked in series if desired. Foam and water solution under pressure enters the main supply line 70 and is delivered to the spray battery 18 when the valve 80 is open. Due to the restriction 75 a pressure drop is created within the main supply line 70 which causes high pressure to exist in branch line 76 leading to the fluid motor inlet 42. The pressure downstream of the restriction 75 is maintained sufficient to supply the nozzles 54. The nozzles inject a spray of foam and water solution into the moving path of air drawn into the air tunnel by the blower 12. The air-borne spray wets the sieve 20 and as the air is blown through the openings ultra-high-expansion foam emerges on the other side. By ultra-high-expansion foam as used herein, the meaning is that the foam has a very high air-to-liquid content, e.g., a ratio of as high as 1000:1 or higher of the volume of air present in the foam to the volume of liquid as disclosed in the copending application U.S. Ser. No. 560,985 filed June 27, 1966.

Often at a fire, the building or rooms are filled with smoke creating a hazard to fire fighting personnel and the occupants. To rely on natural ventitlation would even further endanger lives. Therefore, it is a feature of the invention to provide a foam generator which may be used alternatively as a smoke or fume evacuator when the need arises. To accomplish this, the valve 80 if open, is closed shutting off the nozzle battery 18. The valve 83 in the return line 82 is kept open so that a fluid circuit is maintained between the pumping unit 72 and the fluid motor 40. Thus the blower unit 12 will continue to operate and the generator may be used in the manner of an exhaust fan. Of course, instead of facing the generator as before, with the foam projecting end directed toward the fire, it is merely reversed with the blower end located adjacent an opening into the space to be evacuated, for example, a window or door of the smoke filled room.

From the above description of the invention with reference to the embodiments shown it will be clear that certain modifications can be made without deviating from the invention as defined in the appended claims which cover such embodiments and modifications except insofar as they are limited by the prior art.

We claim:

1. Apparatus of the type described which may be alternately used as a foam generator or smoke evacuator and which is capable of being employed at a fire site where fluid pressure is the only available source of power, said apparatus comprising an air tube with an inlet and an outlet opening and foam generating perforated means mounted therein, blower means within the air tube for moving large volumes of air therethrough, jet means opening into the air tube for projecting a spray of liquid foam producing solution onto said perforated means, fluid operable motor means drivingly connected to the blower means, a fluid pressure source for pressurizing the foam producing solution, passage means providing fluid communication between the fluid pressure source and jet means, other passage means providing communication between the fluid pressure source and motor means for supplying pressurized foam producing solution to operate the motor means, and valve means in said first passage means operable to shut off said jet means whereby the fluid pressure source will continue to operate the blower means independently.

2. Apparatus according to claim 1 wherein said fluid pressure source includes a fluid reservoir and said other passage means comprises a return passage mean from said fluid motor means to said reservoir whereby a recirculating path for said foam producing solution is provided.

3. A foam generator adapted for use as a first protection apparatus having motor powered blower means for developing a high expansion foam and being capable of use at a fire site where fluid pressure is the only available source of power, said apparatus including an air tube having inlet and outlet openings, said blower means being located within the air tube and being operable to move large volumes of air therethrough, jet means opening into the air tube for introducing a spray of liquid foam producing solution, covering the free-passage-area of the air tube downstream of the jet means which is wet by the air-borne spray, a fluid pressure system having fluid pumping means and including a main supply line connected at one end to said pumping means and at the other end to said jet means, flow restricting means in said main supply line between said ends, fluid operable motor means drivingly connected to said blower means, a delivery passage connecting at one end to the main supply line upstream of said restriction means and at the other end to an inlet port of said motor means, a return passage connected at one end to the main supply line downstream of said restriction means and at the other end to an outlet port of the motor means whereby the pumping means operates both the fluid motor and jet means thus eliminating the need for an auxiliary source for the motor powered blower means.

References Cited

UNITED STATES PATENTS

| | | |
|---|---|---|
| 2,218,294 | 10/1940 | Muller. |
| 2,478,998 | 8/1949 | Boyd et al. |
| 2,829,874 | 4/1958 | Freeman. |
| 2,990,165 | 6/1961 | Joseph. |
| 3,142,340 | 7/1964 | Jamison. |
| 3,186,490 | 6/1965 | Jamison et al. |
| 3,241,617 | 3/1966 | Jamison. |

TIM R. MILES, Primary Examiner